United States Patent
Huang et al.

(10) Patent No.: US 7,802,119 B2
(45) Date of Patent: Sep. 21, 2010

(54) METHOD AND SYSTEM FOR SAVING POWER OF CENTRAL PROCESSING UNIT

(75) Inventors: Wen-Juin Huang, Taipei (TW);
Chung-Ching Huang, Taipei (TW);
Jui-Ming Wei, Taipei (TW)

(73) Assignee: VIA Technologies, Inc., Taipei (TW)

( * ) Notice: Subject to any disclaimer, the term of this patent is extended or adjusted under 35 U.S.C. 154(b) by 811 days.

(21) Appl. No.: 11/707,966

(22) Filed: Feb. 20, 2007

(65) Prior Publication Data
US 2008/0010476 A1    Jan. 10, 2008

(30) Foreign Application Priority Data
Jul. 7, 2006    (TW) .............. 95124843 A

(51) Int. Cl.
*G06F 1/00*    (2006.01)
*G06F 1/32*    (2006.01)
(52) U.S. Cl. .................. 713/323; 713/300; 713/320; 711/146
(58) Field of Classification Search ............. 713/300, 713/320, 323; 711/146
See application file for complete search history.

(56) References Cited

U.S. PATENT DOCUMENTS 6,085,330 A * 7/2000 Hewitt et al. ............. 713/322
6,125,450 A * 9/2000 Kardach .................... 713/323

FOREIGN PATENT DOCUMENTS

| CN | 1794140 | 6/2006 |
| CN | 1804759 | 7/2006 |
| WO | WO 98/44405 | * 2/1998 |

* cited by examiner

*Primary Examiner*—Thomas Lee
*Assistant Examiner*—Michael J Brown
(74) *Attorney, Agent, or Firm*—Thomas, Kayden, Horstemeyer & Risley, LLP

(57) ABSTRACT

For saving power of a central processing unit at a C3 power level upon processing a bus master request from a peripheral device, an arbitrator is disabled from transmitting any request to the central processing unit at the C3 power level. Afterwards, in response to a bus master request, the central processing unit is switched from the C3 power level to a transitional C0 power level while keeping the arbitrator disabled, and then switched from the transitional C0 power level to a C2 power level while enabling the arbitrator to process the bus master request.

14 Claims, 3 Drawing Sheets

METHOD AND SYSTEM FOR SAVING POWER OF CENTRAL PROCESSING UNIT

FIELD OF THE INVENTION

The present invention relates to a power saving method and a power saving system, and more particularly to method and system for saving power of a central processing unit.

BACKGROUND OF THE INVENTION

With the increasing development of computing technology industries, a variety of electronic apparatus such as personal computers, notebook computers or mobile phones become essential to human's life. Meanwhile, the electronic apparatus consumes electric power that is also essential to human's life. Therefore, it is a trend to design electric apparatus with high performance but low power-consumption.

Advanced Configuration and Power Interface (ACPI) is one of the popular systems for managing the power of a personal computer system or notebook computer system. The power states defined in the ACPI specification include G (global state), D (device state), S (sleeping state) and C (CPU state). The G state is indicative of a system power state; the device state is indicative of a device power state; the sleeping state is indicative of an OS (operating system)-idle power state; and the C state is indicative of a CPU power state. The C state is further classified into four levels, i.e. C0, C1, C2 and C3. The operating system will have the CPU enter one of the four levels according to the current operational state of the CPU.

When the CPU is in a normal working state so as to execute instructions, the power level of the CPU is supposed to be in the C0 level. If the CPU is not executing instructions but is required to return to work in a short time, the CPU should be in the C1 power level. Further, if the CPU needs only to execute limited functions, e.g. snooping and dealing with a bus master request for a peripheral device to access to a system memory, a C2 power level is properly entered. With almost no task, the CPU will enter the C3 power level.

Please refer to FIG. 1, which is a schematic configuration diagram of the CPU power levels defined by the ACPI specification. As shown in FIG. 1, no matter if the CPU power is at the C1, C2 or C3 level, the CPU will recover to the C0 power level to execute an interrupt service when receiving an interrupt request from the peripheral device. For example, a peripheral device issues a bus master request to access the data stored in the system memory, the CPU needs to execute a snooping function. Generally, for executing the snooping function, the power level of the CPU should be C2 or above. In other words, the CPU cannot execute the snooping function at the C3 power level. Accordingly, if the CPU is at the C3 power level, it is required that the CPU recovers to the C0 power level from the C3 level so as to execute the snooping function to have the bus master request processed.

It is understood from the above descriptions that the CPU is inefficiently recovered from the C3 level to the C0 level since the C2 power level would be enough for executing the snooping function. Moreover, after the bus master request is processed, the CPU stays at the C0 power level until next power-saving condition is applied, which results in more unnecessary power consumption.

SUMMARY OF THE INVENTION

Therefore, the present invention provides a power saving method and a power saving system capable of accomplishing proper power management for snooping so as to reduce power consumption.

The present invention provides a method for saving power of a central processing unit at a non-snooping power level upon processing a bus master request from a peripheral device. The method includes: switching the central processing unit from the non-snooping power level to a transitional working power level in response to a bus master request; and switching the central processing unit from the transitional working power level to a snooping power level to process the bus master request.

In an embodiment, the non-snooping power level, transitional working power level and snooping power level are C3, C0 and C2 levels defined according to Advanced Configuration and Power Interface (ACPI) specifications.

The present invention further provides a method for saving power of a central processing unit at a C3 power level upon processing a bus master request from a peripheral device. The method includes: disabling an arbitrator from transmitting any request to the central processing unit at the C3 power level; switching the central processing unit from the C3 power level to a transitional C0 power level in response to a bus master request while keeping the arbitrator disabled; and switching the central processing unit from the transitional C0 power level to a C2 power level while enabling the arbitrator to process the bus master request.

The present invention further provides a system for saving power of a central processing unit. The system includes a power management unit for optionally switching the power level of the central processing unit between a non-snooping power level and a snooping power level via a working power level; and an arbitrator disabled when the central processing unit is switched to the non-snooping power level, enabled when the central processing unit is switched to the snooping power level, and selectively enabled/disabled according to a type of a request from a peripheral device when the central processing unit is switched to the working power level in response to the request.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2:
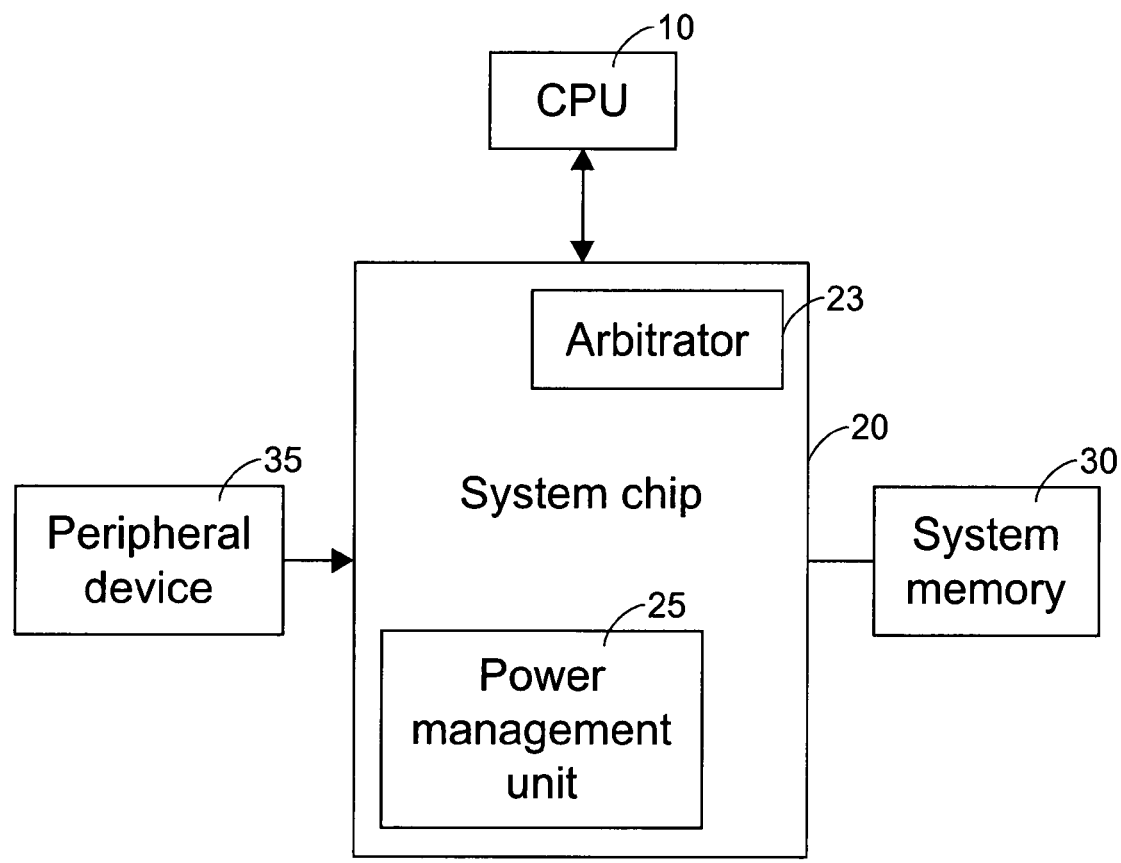
FIG. 2 is a schematic functional block diagram of a computer system with power saving functions according to an embodiment of the present invention.

Referring to FIG. 2, a computer system with power saving functions according to an embodiment of the present invention is illustrated. The computer system includes a central processing unit (CPU) 10, a system chip 20, a system memory 30 and a peripheral device 35. The system chip 20 is electrically connected to the CPU 10, the system memory 30 and the peripheral device 35. The system chip 20 includes an arbitrator 23 and a power management unit 25. Via the arbitrator 23, a bus master request or interrupt request can be transmitted to the CPU 10 to be snooped and/or processed. The power management unit 25 of the system chip 20, on the other hand, issues a control signal to have the CPU 10 enter one of various power levels according to the utilization situations of the CPU. For example, when the operating system detects that the CPU is idle to a certain extent, the operating system will have the CPU enter the C3 power level in response to a control signal of the power management unit 25.

Hereinafter, examples are given to describe the power saving functions of the computer system of FIG. 2.

Figure 1:
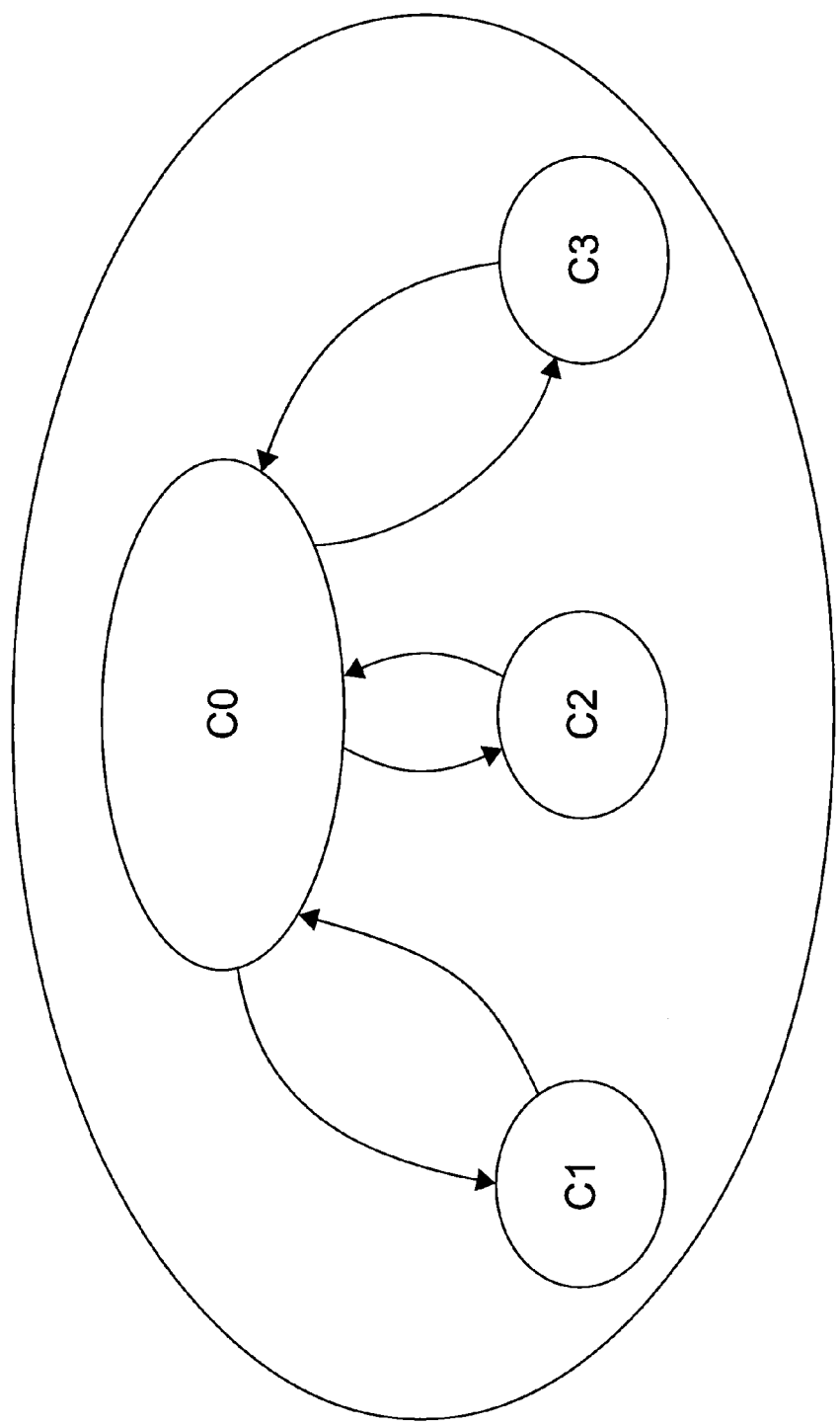
FIG. 1 is a schematic configuration diagram of four CPU power levels defined by the ACPI specification.

It is assumed that the CPU 10 is now at the C3 power level. For accessing to the system memory 30, the peripheral device 35 issues a bus master request to the system chip 20, which requires the CPU 10 to execute a snooping function. For executing the snooping function, the CPU 10 has to leave the non-snooping C3 power level, and enter a snooping power level such as C0, C1 or C2 level. Basically, the more power-effective power level C2 would be enough for executing the snooping function. As described above with reference to FIG. 1, the power management unit 25 of the system chip 20 allows the power level of the CPU 10 to be switched only via fixed paths between the C0 level and the C1 level, between the C0 level and the C2 level, and between the C0 level and the C3 level. For switching the power level of the CPU 10 from the C3 level to the C2 level, the CPU 10 has to be switched from the C3 level to the transitional C0 level and then switched to the objective C2 level. After the snooping operation has completed, it is preferred that the CPU 10 returns the C3 power level for saving power. Similarly, for switching the power level of the CPU 10 from the C2 level back to the C3 level, the CPU 10 has to be switched from the C2 level to the transitional C0 level and then switched to the objective C3 level. In spite the CPU 10 remains at the C0 level for a while on the way from the C2 level to the C3 level or from the C3 level to the C2 level, the CPU 10 need not actually execute any command in this case. Under this circumstance, it is preferred that the CPU 10 leaves the C0 level as soon as possible for minimizing power consumption.

Generally, after the CPU 10 enters the C3 power level, the arbitrator 23 is disabled by the system chip 20 from transmitting any bus master request or interrupt request to the CPU 10. Afterwards, when the CPU 10 is switched from the C3 level to the C0 level in response to a control signal issued by the power management unit 25, the system chip 20 issues a reply message to the CPU 10 while enabling the arbitrator 23 in response to a control command from the operating system. Then the CPU 10 is able to realize and execute the command from the operating system via the enabled arbitrator 23. It also means that the CPU 10, even if at the working power level C0, will not acquire and execute the command from the operating system until receiving the reply message. Therefore, the CPU 10 may be switched out of the C0 level soon by blocking the reply message and disabling the arbitrator 23.

In brief, for executing the snooping function, the CPU 10 leaves the C3 level and temporarily enters the C0 level. Meanwhile, the system chip 20 of the present invention blocks the reply message from being transmitted to the CPU 10 and disables the arbitrator 23. In this way, the CPU 10 may stay at the C0 level while exempting from executing any command from the operating system. Afterwards, the CPU 10 is forced to enter the C2 level from the C0 level by the power management unit 25. Meanwhile, the arbitrator 23 is enabled to allow the CPU 10 to snoop and deal with the bus master request at the C2 level. After the bus master request has been processed, the CPU 10 is forced by the power management unit 25 to leave the C2 level and enter the C3 level via the transitional C0 level. Likewise, the arbitrator 23 is preferably disabled when the power level of the CPU 10 is switched from the C2 level to the C0 level, thereby preventing the CPU 10 from being redundantly interrupted. On the other hand, if an interrupt request is issued by the peripheral device 35 instead of a bus master request, a reply message is allowed to be transmitted to the CPU 10 via an enabled arbitrator 23 when the CPU 10 recovers to the C0 level in response to the interrupt request. Then the CPU 10 may execute an interrupt service at the C0 power level in response to the interrupt request.

Figure 3:
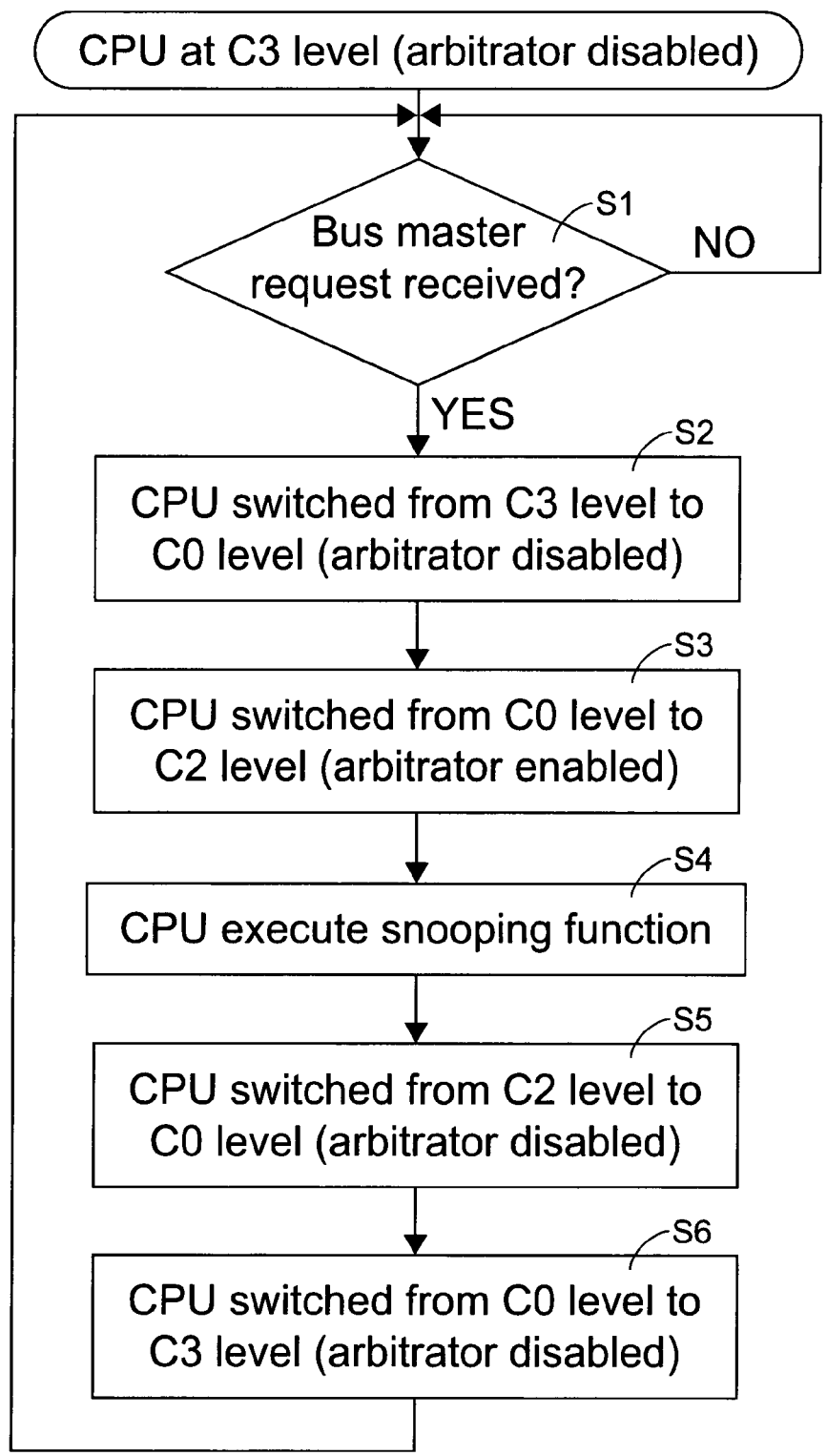
FIG. 3 is a flowchart illustrating a power saving method of the present invention.

Hereinafter, an embodiment of a power-saving method for use in system comprising a CPU, a system chip and a peripheral device according to the present invention is summarized in the flowchart of FIG. 3.

When the CPU is in a C3 power level, an arbitrator of the system chip for transmitting a request to the CPU is disabled for protecting the CPU from being unduly interrupted. Afterwards, if a bus master request is issued by the peripheral device to the system chip (Step S1), a power management unit of the system chip issues a first control signal to have the CPU leave the C3 level and enter the C0 level (Step S2). Meanwhile, the system chip blocks a reply message corresponding to the bus master request from being transmitted to the CPU while keeping the arbitrator disabled. As a result, the CPU at the C0 power level, will not work redundantly.

Subsequently, the CPU is switched from the C0 to the C2 level while enabling the arbitrator in response to a second control signal asserted by the power management unit (step S3) so as to allow the CPU to snoop and deal with the bus master request (Step S4).

After the bus master request has been processed, the power management unit issues a third control signal to have the CPU switched from the C2 level to the C0 level while disabling the arbitrator (Step S5). Since the arbitrator 23 is disabled, the CPU will not execute any command at this moment. Then, in response to a fourth control signal asserted by the power management unit, the CPU 10 leaves the C0 power level and enters the C3 power level, and the arbitrator is disabled again (step S6). The CPU then stays at the C3 power level until next request comes.

On the other hand, if the peripheral device issues an interrupt request when the CPU is at the C3 power level, the power management unit will issue a control signal to have the CPU switched from the C3 power level to the C0 power level with the arbitrator enabled. The CPU then executes an interrupt service in response to the interrupt request transmitted via the arbitrator.

To sum up, according to the present invention, the CPU is switched from the C3 level to the C2 level via the C0 level instead of remaining at the C0 level to perform the snooping function, thereby reducing power consumption of the CPU. In addition, the power saving performance of the CPU can be further improved by optionally blocking the reply message corresponding to a bus master request and disabling the arbitrator when the C0 level of the CPU is just transitional. Moreover, the CPU, after completing the processing of the bus master request, is forced back to the C3 power level, thereby further reducing power consumption of the CPU.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for saving power of a central processing unit upon processing a bus master request from a peripheral device, the method comprising steps of:
   switching the central processing unit from a non-snooping C3 power level to a transitional working C0 power level in response to a bus master request while blocking a reply message corresponding to the bus master request from being transmitted to the central processing unit at the transitional C0 power level; and
   switching the central processing unit from the transitional C0 power level to a snooping C2 power level to process the bus master request.

2. The method according to claim 1 wherein an arbitrator for transmitting the bus master request to the central processing unit remains disabled during both of the C3 power level and the transitional C0 power level of the central processing unit.

3. The method according to claim 2 further comprising a step of enabling the arbitrator when the central processing unit is switched from the transitional C0 power level to the C2 power level to process the bus master request.

4. The method according to claim 3 further comprising a step of: switching the central processing unit from the C2 power level to the C3 power level via the transitional C0 power level with the arbitrator disabled after the bus master request is processed by the central processing unit.

5. A method for saving power of a central processing unit upon processing a bus master request from a peripheral device, the method comprising steps of:
   disabling an arbitrator from transmitting any request to the central processing unit when the central processing unit is at a C3 power level;
   switching the central processing unit from the C3 power level to a transitional C0 power level in response to a bus master request while keeping the arbitrator disabled at the transitional C0 power level of the central processing unit; and
   switching the central processing unit from the transitional C0 power level to a C2 power level with the arbitrator enabled at the C2 power level of the central processing unit to process the bus master request.

6. The method according to claim 5 wherein the arbitrator is kept disabled when the central processing unit is switched to the transitional C0 power level by blocking a reply message from an operating system corresponding to the bus master request.

7. The method according to claim 5 further comprising a step of: switching the central processing unit from the C2 power level to the C3 power level via the transitional C0 power level with the arbitrator disabled after the bus master request is processed by the central processing unit.

8. A system for saving power of a central processing unit, the system comprising:
   a power management unit for optionally switching the power level of the central processing unit between a non-snooping power level and a snooping power level via a working power level; and
   an arbitrator disabled when the central processing unit is switched to the non-snooping power level, enabled when the central processing unit is switched to the snooping power level, and selectively enabled/disabled according to a type of a request from a peripheral device when the central processing unit is switched to the working power level in response to the request.

9. The system according to claim 8 wherein the arbitrator is enabled when the central processing unit is switched from the non-snooping power level to the working power level in response to an interrupt request.

10. The system according to claim 8 wherein the arbitrator is disabled when the central processing unit is switched from the non-snooping power level to the working power level in response to a bus master request.

11. The system according to claim 10 wherein the arbitrator is disabled when the central processing unit is switched from the snooping power level to the working power level after the bus master request is processed.

12. The system according to claim 10 wherein the power management unit and the arbitrator are disposed in a system chip.

13. The system according to claim 12 wherein the system chip blocks a reply message corresponding to the bus master request while disabling the arbitrator when the central processing unit is switched to the working power level in response to the bus master request.

14. The system according to claim 13 wherein the non-snooping power level, working power level and snooping power level are C3, C0 and C2 levels defined according to Advanced Configuration and Power Interface (ACPI) specifications.

* * * * *